(12) United States Patent
Wu et al.

(10) Patent No.: US 11,960,644 B2
(45) Date of Patent: Apr. 16, 2024

(54) SYSTEM AND METHOD FOR GAZE AND POSE DETECTION TO ANTICIPATE OPERATOR INTENT

(71) Applicant: Rockwell Collins, Inc., Cedar Rapids, IA (US)

(72) Inventors: Peggy Wu, Ellicott City, MD (US); Ahmad F. Osman, Wethersfield, CT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/481,959

(22) Filed: Sep. 22, 2021

(65) Prior Publication Data
US 2023/0039764 A1   Feb. 9, 2023

Related U.S. Application Data

(60) Provisional application No. 63/230,315, filed on Aug. 6, 2021, provisional application No. 63/229,806, filed on Aug. 5, 2021.

(51) Int. Cl.
*G06F 3/01* (2006.01)
*B64D 43/00* (2006.01)
(Continued)

(52) U.S. Cl.
CPC .............. *G06F 3/013* (2013.01); *B64D 43/00* (2013.01); *B64D 47/08* (2013.01); *G06F 3/011* (2013.01);
(Continued)

(58) Field of Classification Search
CPC .......... G06F 3/013; G06F 3/011; G06F 3/017; B64D 43/00; B64D 47/08; G06T 7/70;
(Continued)

(56) References Cited

U.S. PATENT DOCUMENTS 6,237,496 B1    5/2001   Abbott
6,323,884 B1   11/2001   Bird et al.
(Continued)

FOREIGN PATENT DOCUMENTS

EP           2304527 A4      3/2013

*Primary Examiner* — Mihir K Rayan
(74) *Attorney, Agent, or Firm* — Suiter Swantz pc llo

(57) ABSTRACT

A system and method for inferring operator intent by detecting operator focus incorporates cameras positioned within a cockpit or control space of a vehicle and oriented at an operator of the vehicle. The cameras capture images of the operator in a control seat; the images are analyzed (either individually or sequentially) to determine a gaze and/or body pose of the operator (including, e.g., a position and orientation of the torso and limbs). By comparing the determined gaze and/or body pose to the positions and orientations of potential focus targets within the control space (e.g., windows, display units, and/or control panels that the operator may engage with visually and/or physically), the system predicts the most likely future focus target or targets: what the operator is most likely to visually and/or physically engage with next. Operator intent may be further analyzed to identify potentially abnormal or anomalous behavior.

13 Claims, 10 Drawing Sheets

(51) Int. Cl.
*B64D 47/08* (2006.01)
*G06T 7/70* (2017.01)
*G06V 20/59* (2022.01)
*G06V 40/20* (2022.01)

(52) U.S. Cl.
CPC ............... *G06F 3/017* (2013.01); *G06T 7/70* (2017.01); *G06V 40/20* (2022.01); *G06T 2207/10016* (2013.01); *G06T 2207/20081* (2013.01); *G06T 2207/20084* (2013.01); *G06T 2207/30196* (2013.01); *G06T 2207/30201* (2013.01); *G06V 20/597* (2022.01)

(58) Field of Classification Search
CPC ........... G06T 7/246; G06T 2207/10016; G06T 2207/20081; G06T 2207/20084; G06T 2207/30196; G06T 2207/30201; G06T 7/73; G06V 40/20; G06V 40/107; G06V 40/193; G06V 20/597
See application file for complete search history.

(56) References Cited

U.S. PATENT DOCUMENTS

| | | | |
|---|---|---|---|
| 9,547,798 | B2 | 1/2017 | Plummer et al. |
| 9,785,243 | B2 | 10/2017 | Kawalkar |
| 2009/0234529 | A1* | 9/2009 | Sampedro Diaz ...... G06F 9/451 706/14 |
| 2009/0303082 | A1 | 12/2009 | Larson et al. |
| 2014/0320321 | A1* | 10/2014 | Loubiere .............. G01C 19/721 340/980 |
| 2016/0027336 | A1 | 1/2016 | Towers et al. |
| 2016/0357429 | A1* | 12/2016 | Nilo ..................... G06F 3/04883 |
| 2017/0212583 | A1* | 7/2017 | Krasadakis ........... G06F 3/0482 |
| 2017/0364068 | A1 | 12/2017 | Harada et al. |
| 2020/0089315 | A1* | 3/2020 | Stent ...................... G06N 3/084 |
| 2020/0142499 | A1 | 5/2020 | Katz et al. |
| 2020/0326822 | A1* | 10/2020 | Sultan .................. G06F 3/0481 |
| 2021/0173480 | A1 | 6/2021 | Osterhout et al. |
| 2021/0182609 | A1* | 6/2021 | Arar .................... G06V 40/171 |

* cited by examiner

SYSTEM AND METHOD FOR GAZE AND POSE DETECTION TO ANTICIPATE OPERATOR INTENT

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/229,806 entitled SYSTEM AND METHOD FOR GAZE AND POSE DETECTION TO ANTICIPATE OPERATOR INTENT and filed Aug. 5, 2021;
U.S. Provisional Patent Application Ser. No. 63/230,315 entitled OBJECTIVE GAZE GESTURES TO PREDICT OPERATOR SITUATION AWARENESS and filed Aug. 6, 2021;
Said U.S. Provisional Patent Applications 63/229,806 and 63/230,315 are herein incorporated by reference in their entirety.

BACKGROUND

From the moment a pilot, co-pilot, or other aircraft or vehicle operator takes their seat in the cockpit to the moment they leave said seat having arrived at their destination and completed any necessary post-flight checks, they may interact with numerous user interfaces (UI) and/or controls multiple times. Computerized control systems and UI make it possible to log each operator interaction with the cockpit. Similarly, camera-based detection methods can detect in near real time when a human operator has interacted with a cockpit control or user interface, e.g., by detecting arm and hand gestures. However, this approach is only capable of detecting interactions after the interaction or activation of control. It may be advantageous, e.g., in order to develop more intuitive UI and control systems, to anticipate operator intent prior to an interaction or control activation.

SUMMARY

In a first aspect, a system for inferring operator intent by detecting operator focus is disclosed. In embodiments, the system includes cameras positioned within an aircraft or vehicular cockpit (or other control space wherein an operator may be surrounded by various user and control interfaces) and oriented toward the operator (e.g., in a pilot seat or other operating position). The cameras capture an image stream (image sequence) of the operator, e.g., throughout pre-flight, inflight, and post-flight operations. A location database maps the position and orientation of all interfaces within the cockpit (e.g., displays, windows, controls, control panels with which the operator may visually or physically engage) relative to the position and orientation of the camera. Image processors independently analyze the images to detect and identify targets of the operator's visual and physical focus, e.g., what the operator is currently looking at (gaze direction) and/or physically engaging with or actuating (body pose estimation) at any point. Based on the determined visual and physical engagement of the operator, the system infers or predicts future engagements by the operator, e.g., what the operator will look at and/or physically engage with next.

In some embodiments, the body pose estimation includes a position and/or orientation of the operator's arms, hands, and/or fingers, or an assessment of the operator's posture or torso orientation.

In some embodiments, the future focus target, e.g., the inferred future engagement by the operator, includes a cockpit window, a cockpit display, or a mobile communications or computing device carried by the operator, e.g., but not necessarily physically integrated into cockpit instrumentation (e.g., an electronic flight bag (EFB) embodied in a tablet or like mobile device).

In some embodiments, the future focus target is a user interface or control interface, e.g., a manual control (button, switch, toggle) configured for physical engagement by the operator, or a touchscreen display configured for physical, as well as visual, engagement.

In some embodiments, the system receives additional operational context which may influence the probability distribution of inferred future focus targets. Operational context may include, for example: the current flight segment or phase; an operator profile or other identifying information corresponding to a particular operator; the current position of the aircraft or vehicle; or the current heading of the aircraft or vehicle.

In some embodiments, the system assigns a confidence level or probability level to each inferred focus target. For example, the probability distribution of likely future focus targets may be ranked in descending order of confidence level.

In some embodiments, the system stores to memory (e.g., for future use in conjunction with the current operator) operator profiles specific to a particular operator or pilot. For example, operator profiles may include a complete history of predicted future gaze targets, predicted interface engagements, predicted movement patterns incorporating complex sequences of multiple visual and physical engagements (e.g., which may correspond to hierarchical task models), confidence levels associated with each inferred gaze target or interface engagement, or associated operational contexts.

In some embodiments, the system may infer additional gaze targets, interface engagements, or movement patterns by a particular operator based on prior or historical inferences and actions stored within the operator profile for that operator.

In some embodiments, the system analyzes images in sequence (e.g., continuous image streams) to detect shifts in gaze direction and changes in body pose (e.g., from a first gaze direction or body pose to a new gaze direction or body pose), and infers future focus targets based on changes in gaze direction or body pose.

In some embodiments, the system infers a movement pattern or sequence based on the observed shift in gaze direction or body pose, and stores the inferred movement pattern to memory, e.g., to an operator profile for the current operator.

In a further aspect, a method for inferring operator intent by detecting operator focus is also disclosed. In embodiments, the method includes capturing, via cameras mounted in a control space, images of an operator (e.g., of an aircraft or vehicle) within the control space and proximate to visual and physical focus targets, e.g., windows and displays with which the operator may visually engage and controls and interfaces with which the operator may physically engage. The method includes analyzing the captured images to detect a gaze direction or body pose of the operator. The method includes inferring or predicting, based on the determined gaze direction or body pose, a future focus target of the operator, e.g., which interfaces or components within the control space the operator will visually or physically engage with next.

In some embodiments, the method includes analyzing a sequence of stream of successive images and detecting shifts in gaze direction or body pose over time.

In some embodiments, the method includes inferring a movement pattern (e.g., a sequence of multiple visual and physical engagements by an operator) based on detected shifts in gaze direction and body pose.

In some embodiments, the method includes determining a confidence level or probability level for each inferred visual or physical engagement.

In some embodiments, the method includes receiving additional operational context including, but not limited to: a current flight segment or phase; an operator profile or other identifying information specific to the current operator; or the current position and heading of the aircraft or vehicle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
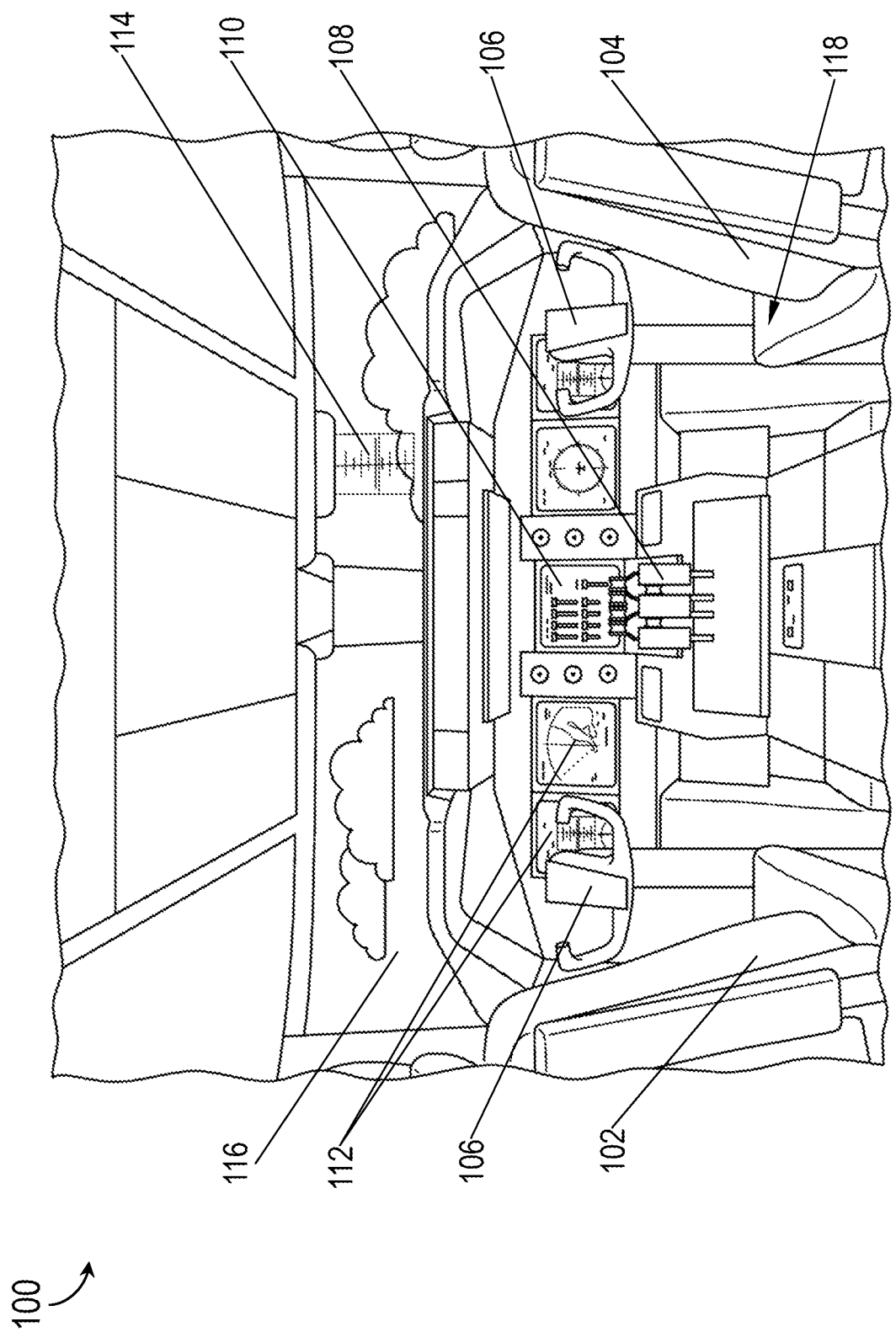
FIGS. 1 and 2 are illustrations of a control space for a mobile platform according to example embodiments of the inventive concepts disclosed herein.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, a system and method for inferring operator intent by detecting operator focus is disclosed. For example, an operator (e.g., pilot, co-pilot or other cockpit crewmember) may be seated in a cockpit or like control space throughout the duration of a flight, remaining in the cockpit seat through pre-flight checks, taxiing, flight segments (e.g., takeoff, climb, cruise, descent, landing), and taxiing to a final destination before disembarkation, apart from short periods when the operator may not be in control of the aircraft (e.g., when another pilot or operator takes control so the operator may temporarily leave the cockpit). While seated in the cockpit seat, the operator may interact with, activate, or otherwise physically and/or visually engage with various cockpit interfaces. Cockpit interfaces may include, but are not limited to: aircraft controls capable of directly adjusting engine operations, control surfaces, or other flight control systems (e.g., control sticks, throttle controls); display surfaces (e.g., primary flight displays (PFD), navigational displays, enhanced vision/synthetic vision displays (EVS/SVS), heads-up displays (HUD)); windows; communications controls and displays; and mission-specific controls and/or displays (e.g., surveillance equipment, weapons/ordnance).

The operator may interact with various cockpit interfaces both as needed based on flight conditions and according to patterns. For example, the operator may frequently scan primary flight and navigational displays to refresh situational awareness according to a scan pattern or sequence. Similarly, for a given aircraft configuration, each cockpit interface may be consistently disposed in a fixed position and orientation (pose) relative to the operator 06 and/or the cockpit seat. For example, cockpit interfaces may be disposed directly forward of the pilot, in the pilot's primary field of view (e.g., a HUD) or above eye level. Similarly, some cockpit interfaces may be positioned so as to be accessible to the pilot's left or right hand or arm.

In embodiments, one or more cameras may be disposed within the cockpit and oriented toward the operator such that any changes in gaze or body pose on the part of the operator may be detected. For example, the system may include a database including a relative pose of each cockpit interface relative to the cockpit seat. When the operator enters the cockpit seat, the cameras may capture a continuous image stream as the operator proceeds from a default state or pose (e.g., not interacting with any cockpit interfaces, not moving, gaze directed straight ahead and x-axis level) through pre-flight checks and active control of the aircraft through various flight segments. For example, the image stream may capture each successive visual or physical interaction with cockpit interfaces (e.g., as the operator guides the aircraft through taxi, takeoff, and initial climb, scanning cockpit displays and windows throughout), tracking changes in the operator's gaze and body pose.

Figure 2:
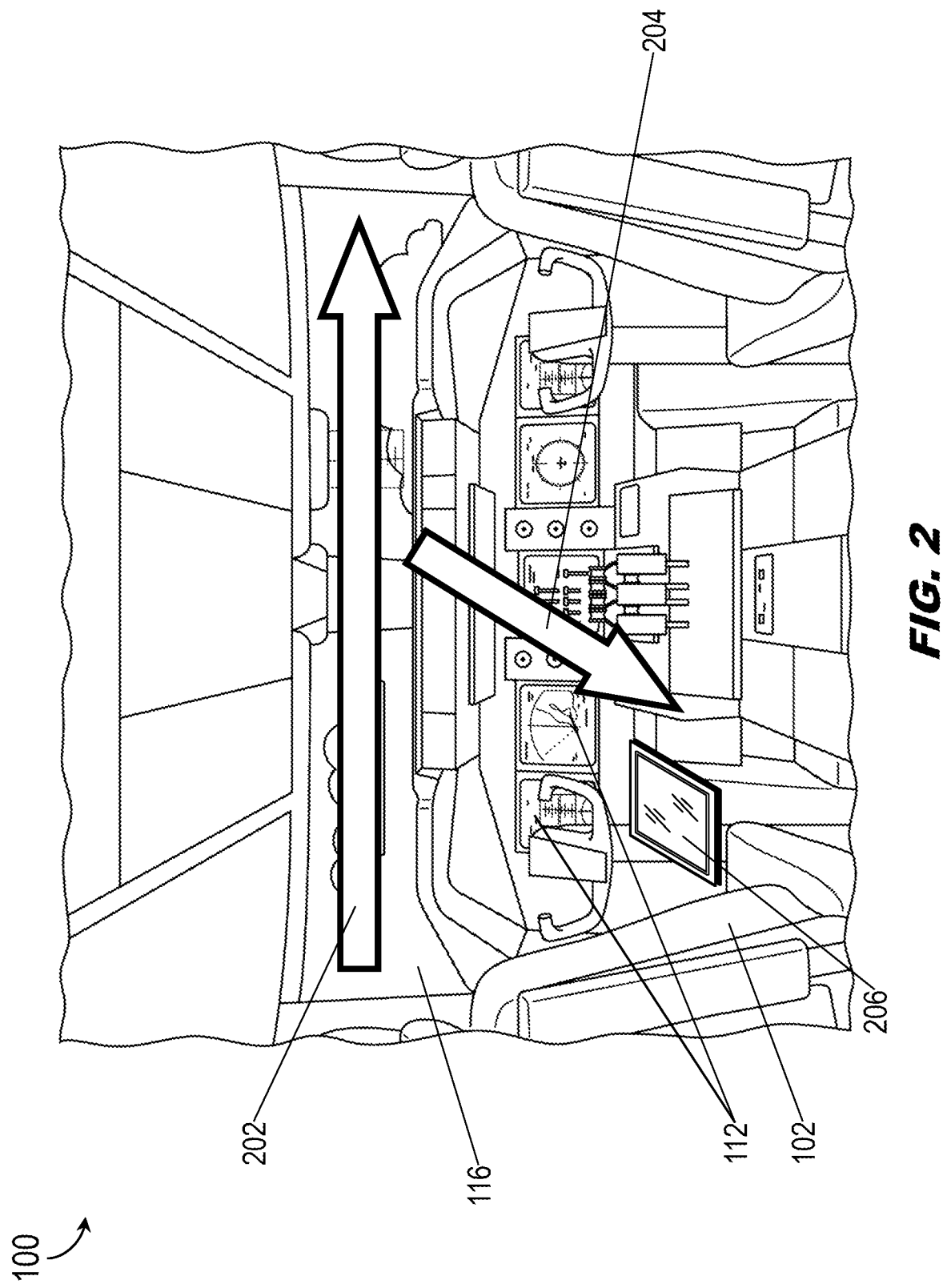

Referring to FIGS. 1 and 2, a control space 100 is disclosed. The control space 100 may include a pilot seat 102, co-pilot seat 104, control sticks 106, throttle controls 108, communications controls 110, flight displays 112, heads-up display 114 (HUD), and windows 116.

In embodiments, the control space 100 may include an aircraft cockpit or any like space set aside for control of a vehicle or mobile platform by one or more operators (e.g., a pilot, co-pilot, and/or other crewmember) occupying a dedicated control position (e.g., the pilot seat 102 or co-pilot seat 104). For example, the operator may occupy either the pilot seat or co-pilot seat 104 and, throughout the totality of a flight sequence (e.g., through taxi, takeoff, climb, cruise, descent, landing, and taxi segments) directly maneuver (or otherwise exercise primary control over) the aircraft 100, e.g., via the control stick 106, throttle controls 108, or other physical controls located in the control space and configured for engagement by the operator.

Similarly, the operator may maintain situational awareness throughout the flight sequence based on visual intelligence. In embodiments, the operator may gain awareness as to the current status of the aircraft 100 by viewing the flight displays 112 (e.g., primary flight displays (PFD), navigational displays, instrumentation displays) and/or the HUD 114. Some or all of the flight displays 112 or HUD 114 may be interactive touchscreens allowing the operator to engage with a touch-sensitive display surface and either adjust the information being displayed or exercise control over the aircraft (or one or more components or subsystems thereof). Further, in embodiments the operator may enhance situational awareness by looking through the windows 116 (e.g., forward windows, side windows). For example, the operator may use the windows 116 to enhance situational awareness by establishing positive visual identification of underlying terrain and natural or astronomical features (e.g., the position of the sun, moon, or stars), manmade landmarks (e.g., airport facilities, manmade obstacles), and/or proximate air traffic (e.g., manned aircraft reporting a position, unmanned aircraft not otherwise reporting a position).

In embodiments, throughout the flight sequence, from initial to final taxiing, the operator may engage with the control space 100 according to detectable routines or patterns. For example, the pilot may be positioned in the pilot seat 102, physically engaging with the control stick 106 and throttle controls 108 via motion of the hand, arm, and/or torso. Similarly, the pilot may, from their position in the pilot seat 102, visually engage with focus targets, e.g., physical controls, flight displays 112, HUD 114, and windows 116 by directing their gaze in the direction of each focus target in order to focus their vision and attention thereon.

In embodiments, the operator may additionally engage with electronic flight bags (EFB) or other like mobile devices not physically incorporated into the control space 100 but introduced therein by the operator and connected (e.g., via physical or wireless link) to the flight control system. For example, the pilot occupying the pilot seat 102 may provide a tablet or like mobile communications device configured for displaying additional visual intelligence. In embodiments, the mobile device may occupy additional space (118) not already occupied by physical controls, windows 116, or display surfaces (112, 114). For example, the tablet may be attached to the pilot's knee (e.g., via a kneeboard), carried in the pilot's lap, mounted on a center console, or otherwise occupying a space 118 low in the operator's field of view (relative to the operator).

Referring also to FIG. 2, as the control space 100 includes multiple focus targets for visual and/or physical engagement, and because at any given moment multiple focus targets may simultaneously require the operator's attention, the operator may from time to time maintain situational awareness via visual scanning according to predetermined patterns (e.g., such that the operator may execute a scan pattern routinely as a matter of muscle memory). For example, the operator occupying the pilot seat 102 may scan (202) the horizon through the forward window 116 (proceeding from left to right relative to the operator), and then scan downward (204) to visually engage the display surfaces 112 and mobile device 206, also from left to right relative to the operator.

In embodiments, any engagement by the operator with a focus target may be visual (e.g., the operator gazes at a display surface), physical (e.g., the operator physically engages with a control interface via one or both hands), or both (e.g., the operator gazes at, and then physically adjusts, a touchscreen).

Figure 3:
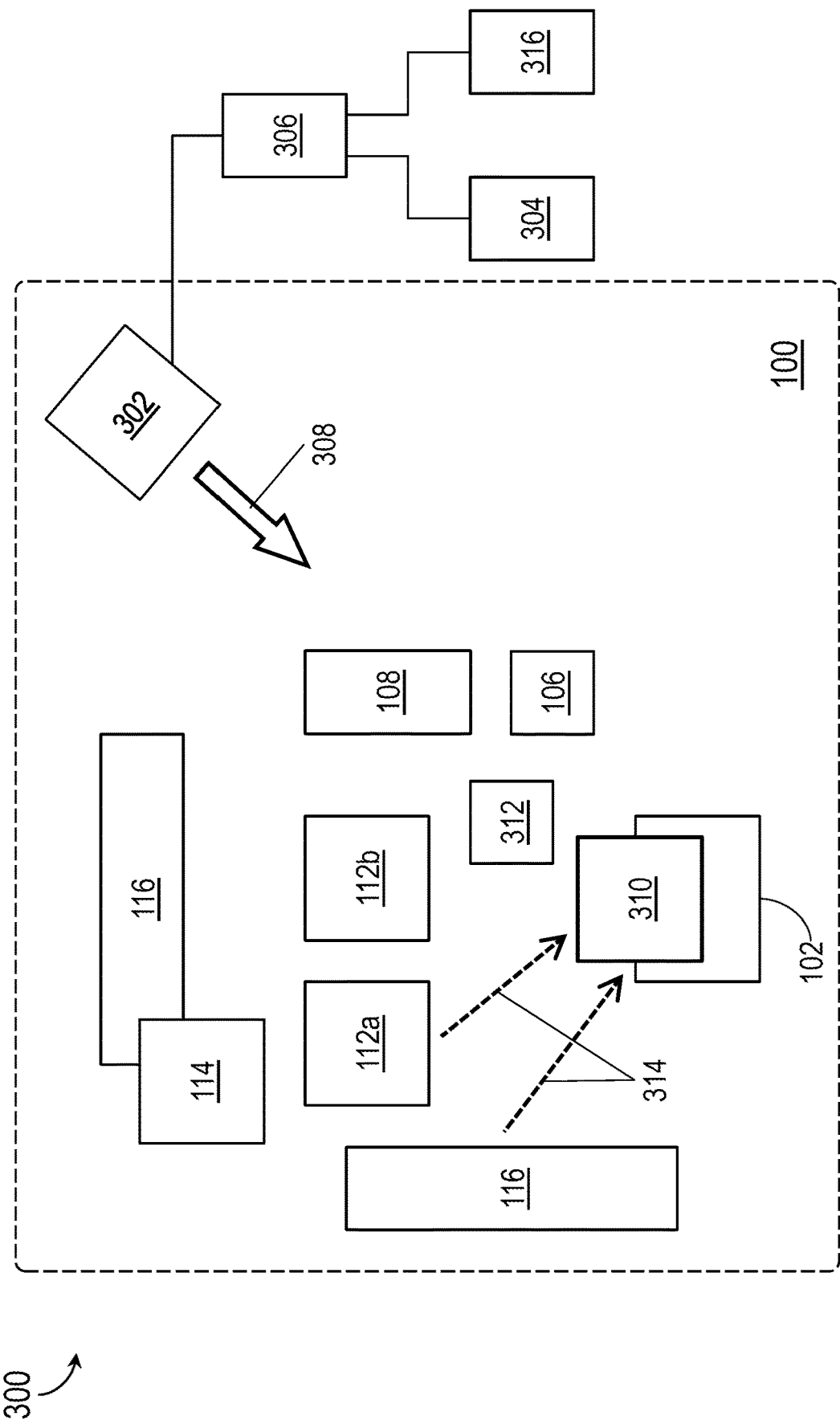
FIG. 3 is a block diagram illustrating a system for inferring intent of an operator within the control space of FIGS. 1 and 2 by detecting operator focus according to example embodiments of the inventive concepts disclosed herein.

Referring now to FIG. 3, a system 300 for inferring operator intent by detecting operator focus is shown. The system 300 may include cameras 302, location database 304 (e.g., memory, data storage), and control processors 306.

In embodiments, the system 300 may focus (308) one or more cameras 302 to capture the pilot seat 102 (or, e.g., the co-pilot seat 104, FIG. 1) and the operator 310 therein. For example, one or more potential focus targets within the control space 100 (e.g., control stick 106, throttle control 108, flight displays 112a-b, HUD 114, windows 116, mobile device 312) may not themselves be in the field of view of the cameras 302 (e.g., unless it is necessary to provide visual confirmation that an inferred engagement has in fact occurred). However, the field of view may include the full potential range of motion of the operator 310 while positioned in the pilot seat 102; the system 300 may infer the absence of the operator 310 as indicative that the operator is absent from the pilot seat or from the control space 100. In some embodiments, each camera 302 will remain fixed in a pose (e.g., a position and orientation, e.g., relative to the control space 100) known to the system 300.

In embodiments, the location database 304 may include target poses corresponding to every potential focus target within the control space 100. For example, the system 300 (e.g., neural networks configured for execution on the control processors 306) may be trained via machine learning techniques to determine a pose of each focus target (e.g., each control stick 106, throttle control 108, flight displays 112a-b, HUD 114, windows 116, mobile device 312, or component thereof if applicable) based on images captured by the cameras 302 of an operator 310. For each operator 310 of consistent height, build, and/or other vital statistics, default poses of the operator's eyes, arms, hands, and/or torso may be determined (e.g., positions and orientations of the eyes, arms, hands, or torso when the operator is in a default state, such as a seated position where the body is at rest and the operator's eyes are in a level forward orientation with respect to multiple axes of rotation (x/pitch, y/roll, z/yaw)). In embodiments, by associating images capturing the operator 310 in various non-default poses, the system 300 may learn one or more target poses relative to the operator corresponding to each focus target within the control space 100. For example, an orientation of the eyes of the operator 310 focused forward (e.g., at or near z-axis normal) and below the baseline (e.g., below x-axis normal) may correspond to a visual focus on the display surface 112b. In some embodiments, multiple target poses may correspond to a single component (e.g., the display surface 112b), such that some target poses may correspond to smaller subcomponents or subsystems of the component (e.g., a particular quadrant or region of the display surface 112b).

In some embodiments, the location database 304 may be preprogrammed with target poses 314 of each component within the control space, and/or each subcomponent or subsystem thereof, relative to the camera 302 and the pilot seat 102. As most components (e.g., each control stick 106, throttle control 108, flight displays 112a-b, HUD 114, windows 116; excepting mobile devices 312, which may be attached to the operator and move therewith or which may not have a fixed position within the control space 100), as well as the camera 302, may have a fixed position and orientation relative to the pilot seat 102, these components may share a common reference frame and therefore fixed poses relative to each other in the common reference frame (e.g., a body frame associated with the control space or embodying vehicle).

In embodiments, throughout the flight sequence the cameras 302 may capture images of the operator 310 any time the operator is positioned in the pilot seat 102. Images may be analyzed by the control processors 306, either individually or sequentially, to determine a current gaze of the operator's eyes and/or body pose of the operator 310. From each determined gaze and/or body pose, the control processors 306 may infer a probability distribution of an imminent engagement of the operator with a focus target, e.g., what the operator most likely intends to look at (visual engagement) or actuate (physical engagement). For example, if the operator 310 looks at and then activates a touchscreen display, engagement may be simultaneously visual and physical.

In some embodiments, the camera 302 may detect the hand of the operator 310 resting on a bracing bezel, or a finger hovering over a specific control, and the system 300 may therefore infer imminent engagement with the associated control. For example, if prior images of the hand resting on the bracing bezel were associated by the system 300 with the activation of a specific control, the system may infer a similar outcome for future images showing the hand in an identical position.

In some embodiments, the system 300 may infer more than one potential action of the operator 310 based on an image or image sequence. For example, if a particular gaze direction or hand/arm position is consistent with more than one future focus target (e.g., a visual and/or physical engagement), the system 300 may attempt to rank or prioritize multiple potential actions, e.g., from most probable to least probable, based on available operational context. For example, the system 300 may be in communication with a flight management system 316 (FMS). The FMS 316 may provide the system 300 with real-time or near real-time information (e.g., position, attitude, altitude, heading, airspeed) as to the current flight segment (e.g., indicating a transition from cruising altitude to initial descent), atmospheric conditions, and/or operational status of the aircraft and individual components and subsystems thereof. For example, operator activity patterns may differ for segment to segment, both in terms of visual elements monitored and controls articulated. Based on additional information from the FMS 316, the system 300 may more precisely infer the intent of the operator 310 based on gaze and/or body pose determinations, or may more accurately prioritize a probability distribution among two or more future focus targets.

In embodiments, flight segment information or other operational context, e.g., as provided by the FMS 316, may inform whether a likely focus target of the operator 310 may be interpreted as abnormal or anomalous behavior. For example, the control space 100 may include a physical control, e.g., a lever, for deploying or retracting the landing gear. The operator 310 may retract the landing gear during the initial climb phase, and may drop or otherwise deploy the landing gear during the descent phase. At any other point in the flight sequence, any detected intent to actuate the landing gear, e.g., by engaging with the landing gear controller or even hovering over the landing gear for an extended time, may be interpreted as anomalous behavior that may justify an alert or warning.

Figure 4A:
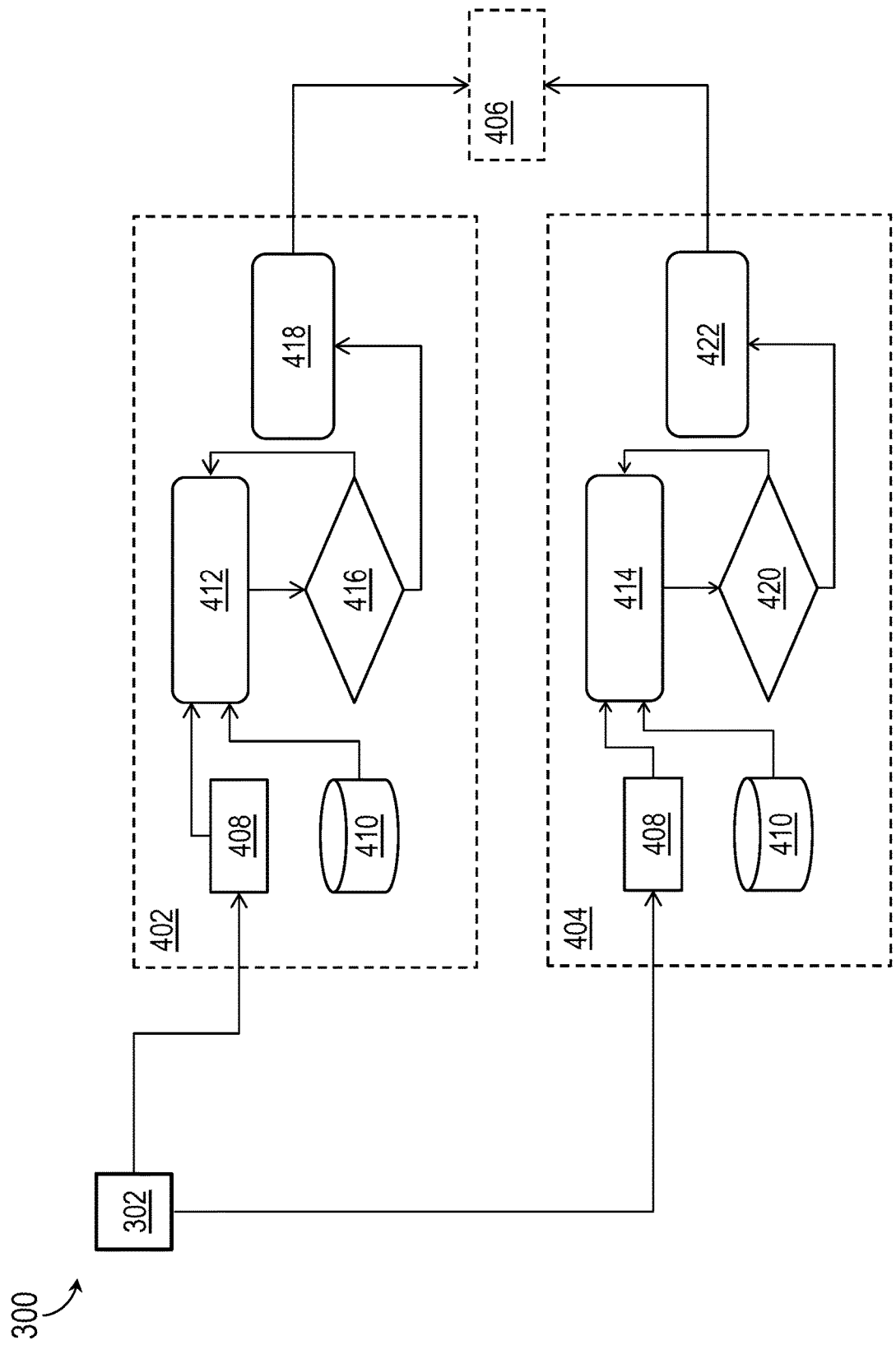
FIGS. 4A and 4B are block diagrams of component modules of the system of FIG. 3.
Figure 4B:
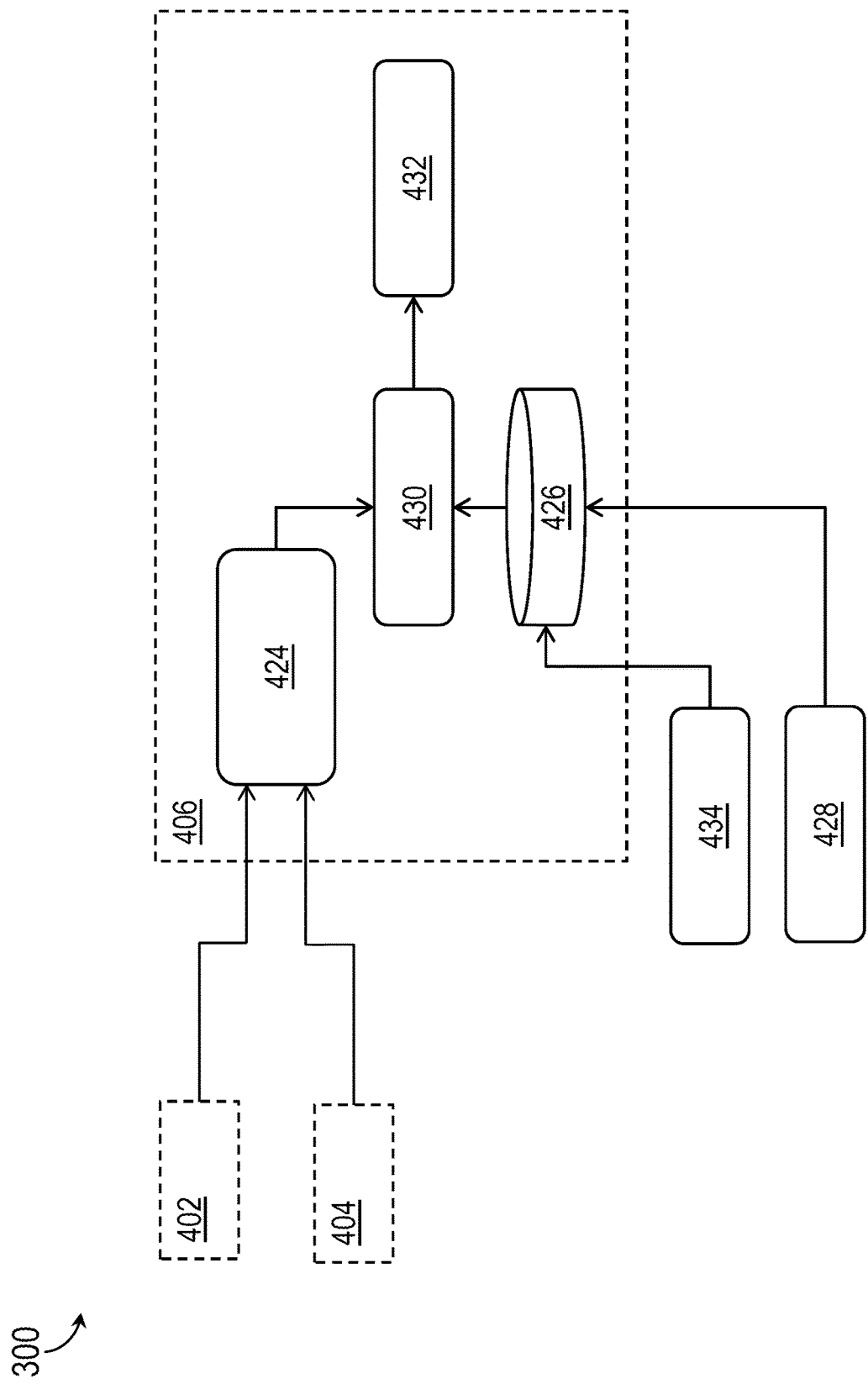

Referring to FIGS. 4A and 4B, the system 300 is shown.

In some embodiments, image processing may include description logic (DL) based face detection and/or body pose estimation. For example, the system 300 may be trained via deep learning techniques to identify within images (or image sequences) human faces and bodies. When facial features are detected within an image or image sequence, the images may be analyzed with greater precision to determine an alignment or pose of the eyes of the operator (310, FIG. 3), as well as other facial features whose alignment relative to the cameras (302, FIG. 3) may be indicative of a head pose of the operator. Similarly, the system 300 may be trained via deep learning techniques to identify limbs and other elements of the upper body or body generally. When the locations and orientations of limbs or body parts in the frame are determined with sufficient confidence, detection data may be mapped to the locations and orientations of focus targets within the control space (100, FIG. 1) to infer the likely future focus targets with which the operator 310 intends to visually and/or physically engage (e.g., if the operator is looking toward, or reaching for, a control panel or a control).

In embodiments, referring in particular to FIG. 4A, the system 300 may include a face detection module 402, a body pose estimation module 404, and an intent prediction module 406. For example, the face detection module 402 and body pose estimation module 404 may each independently buffer (408) and analyze images captured by the camera 302. Both the face detection module 402 and body pose estimation module 404 may incorporate deep learning models (410) pre-trained (e.g., on a database of training images) that inform deep-learning based detection within the captured images, e.g., deep learning-based facial detection 412 and deep learning-based body/body part detection 414.

In embodiments, deep learning-based facial detection 412 may incorporate analysis of each buffered image to determine (416) whether a human face is present, e.g., via detection of individual facial features (eyes, nose, mouth) or groups of facial features appropriately oriented to suggest a human face. For example, if the operator (310, FIG. 3) is absent from the pilot seat (102, FIG. 3), no human face will be detected. If, however, a human face is detected to a sufficient confidence level, the corresponding image or images may be forwarded for further action (418). For example, detected facial features may be compared to reference images of the same operator 310 to determine the position and orientation of the operator's face and eyes (gaze), e.g., relative to a default position/orientation/gaze, and then forwarded to the intent prediction module 406 for further processing Similarly, in embodiments, deep learning-based body/body part detection 414 may analyze buffered images to determine (420) whether the image/s include relevant body parts, e.g., arms, hands, torso (based on comparisons to reference images). If, for example, relevant body parts are detected, their locations in the frame and orientations to each other may be determined (422) and, if body part locations/orientations are determined to sufficient confidence, forwarded to the intent prediction module 406 for further processing.

Referring also to FIG. 4B, the intent prediction module 406 is shown.

In embodiments, the intent prediction module 406 may include temporal alignment and smoothing (424) configured to align information received from the face detection module 402 and body pose estimation module 404 in the proper timeframe (image analysis information from these two sources may be interrelated, e.g., if an imminent engagement has both a visual and a physical dimension). The intent prediction module 406 may incorporate machine learning (ML) models (426) informed by hierarchical task representations (428), which ML learning models may in turn train an action/intent classifier (430) to determine the most likely intent of the operator 310 (e.g., the most likely future focus target) based on the determined gaze and/or body pose. For example, the action/intent classifier 430 may output a probability distribution 432 of future focus targets ranked in order of probability or confidence level, e.g., the focus targets within the control space 100 with which the determined gaze or body pose suggests the operator will most likely engage (the most likely future focus target corresponding to the highest confidence level).

In some embodiments, the ML learning models 426 may be further trained, and the probability distribution of future focus targets determined by the action/intent classifier 430 further informed by, operational context 434. For example, the FMS (316, FIG. 3) may provide positional data and/or flight segment information as described above. In some embodiments, operational context 434 may include information uniquely identifying the operator 310. For example, each operator 310 may be associated with a unique set of vital statistics (e.g., height, weight, proportions) and/or a set of operational habits and/or techniques that may inform their actions in the control space 100. In some embodiments, the location database (304, FIG. 3) may include individual operator profiles. For example, the system 300 may save previously inferred future focus targets associated with a particular operator 310 (e.g., which may be cross-referenced with logs of operator intent to determine the accuracy of the inferred focus targets) such that for subsequent flight sequences associated with the operator, inferences of future focus targets may be additionally based on a stored operator profile of the operator.

In embodiments, probability distributions 432 of likely future focus targets (e.g., the most likely focus targets with which the operator 310 will visually and/or physically engage next) may be further analyzed to assess if a given future focus target is associated with normal behavior or with abnormal or anomalous behavior. For example, abnormal or anomalous behavior may be determined in the context of normal behaviors or activities of any operator with respect to a particular flight segment or set of current operational conditions. Additionally or alternatively, as some operating behaviors may be habitual with respect to a particular operator 310, the normality or abnormality of a particular future focus target may be assessed in the context of prior flight segments, or similar sets of operating conditions, corresponding to that operator.

Figure 5:
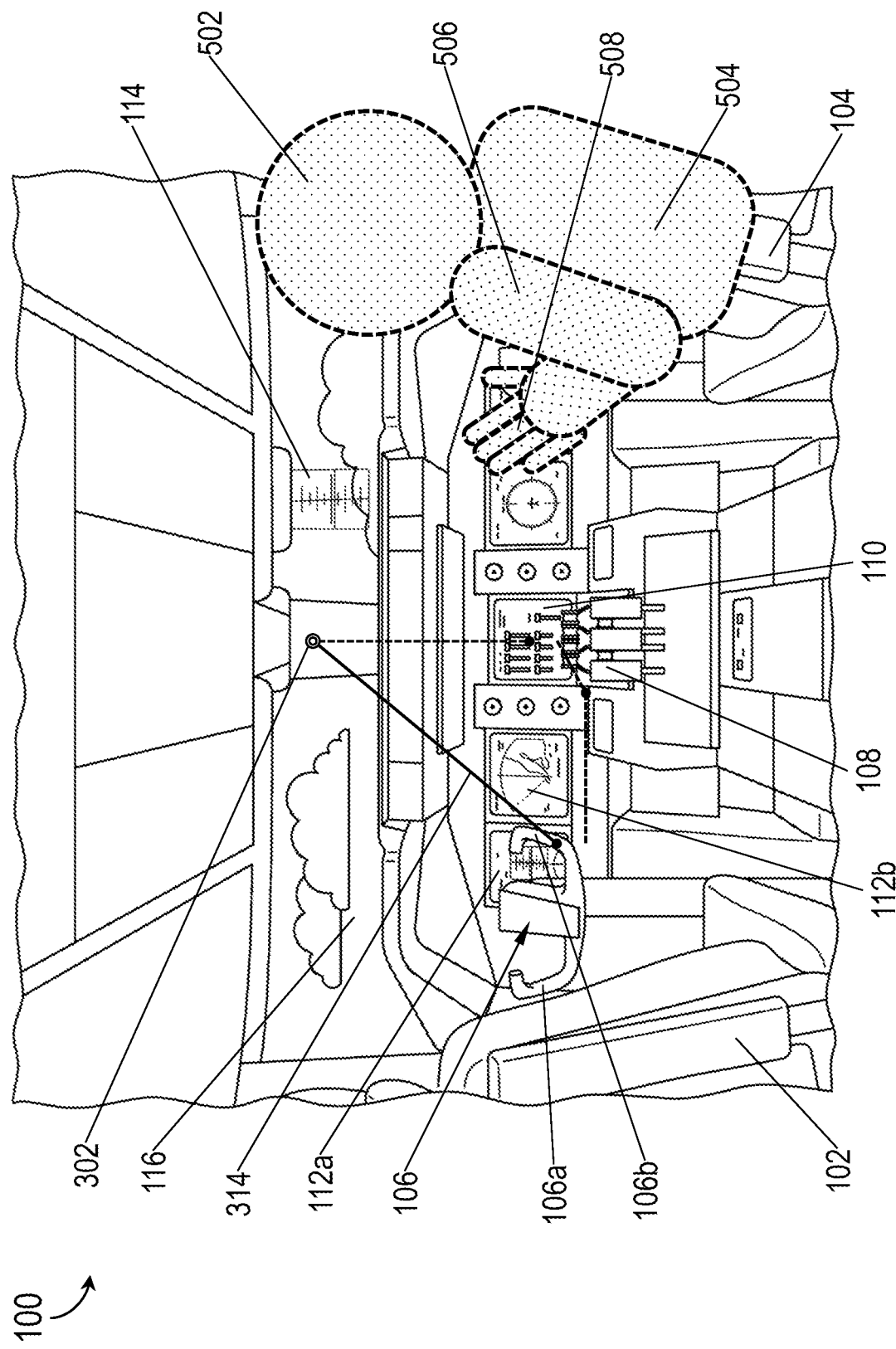
FIG. 5 is an illustration of target poses within the control space of FIG. 1.

Referring to FIG. 5, the control space 100 is shown.

In embodiments, the location database (304, FIG. 3) may map a target pose 314 for each user interface and/or control interface within the control space, relative to the position and orientation of the camera 302. For example, each target pose 314 may include a relative position (e.g., in Cartesian coordinates, polar coordinates, or other like coordinate systems) of a possible focus target with which a pilot or operator seated in the pilot seat 102 may engage, relative to the camera 302 oriented toward the operator. In some embodiments, separate cameras 302 may be positioned forward in the control space 100 and oriented toward the pilot seat 102 and co-pilot seat 104 respectively.

In embodiments, the location database 304 may include target poses 314 for each pilot/co-pilot seat 102, 104, control stick 106, throttle control 108, communications controls 110, flight display (112, FIG. 1), HUD 114, and window 116. Further, the location database 304 may incorporate target poses 314 for individual components and/or subdivisions of user/control interfaces in order to allow prediction of operator intent as precisely as possible. For example, the location database may include distinct target poses 314 uniquely identifying the left-side handle 106a and right-side handle 106b of the control stick 106, upper or lower portions thereof, and each button or trigger incorporated by the control stick. In the same way, the location database 304 may distinguish between different flight displays 112 (e.g., a PFD 112a as opposed to a navigational display 112b), forward and side windows 116, and/or individual buttons, switches, and controls.

In embodiments, the control processors (306, FIG. 3) may analyze images and image streams captured by the camera 302 to detect, locate, and place within three-dimensional space the pilot or operator occupying the pilot seat 102 or co-pilot seat 104. For example, given the known target pose 314 of the co-pilot seat 104 relative to the camera 302, the control processors 306 may identify spaces corresponding to a likely location of the operator's head (502), the operator's torso (504), the operator's upper and lower arms (506), and the operator's hand and fingers (508), and concentrate on portions of the image 600 corresponding to the identified spaces to detect the operator. In embodiments, the identification of spaces may be based on average operator height, weight, and/or build statistics; in some embodiments the control processors may adjust target spaces within the image 600 based on known vital statistics of a particular operator as provided by an operator profile stored to the location database 304 and corresponding to that operator.

In some embodiments, an operator 310 may calibrate the system 300 for optimal compatibility, e.g., if no operator profile currently exists for that operator. For example, during an initial pre-flight phase (e.g., while the aircraft is stationary at a gate, before the aircraft has begun the initial taxi phase), the system 300 may adjust the face detection module (402, FIG. 4A), body pose estimation module (404, FIG. 4A), and/or intent prediction module (406, FIGS. 4A-B), e.g., based on reference images captured during the calibration operation) such that the control processors 306 are acclimated to the height, weight, proportions, and other vital statistics of the operator 310 for optimally efficient image processing.

Figure 6A:
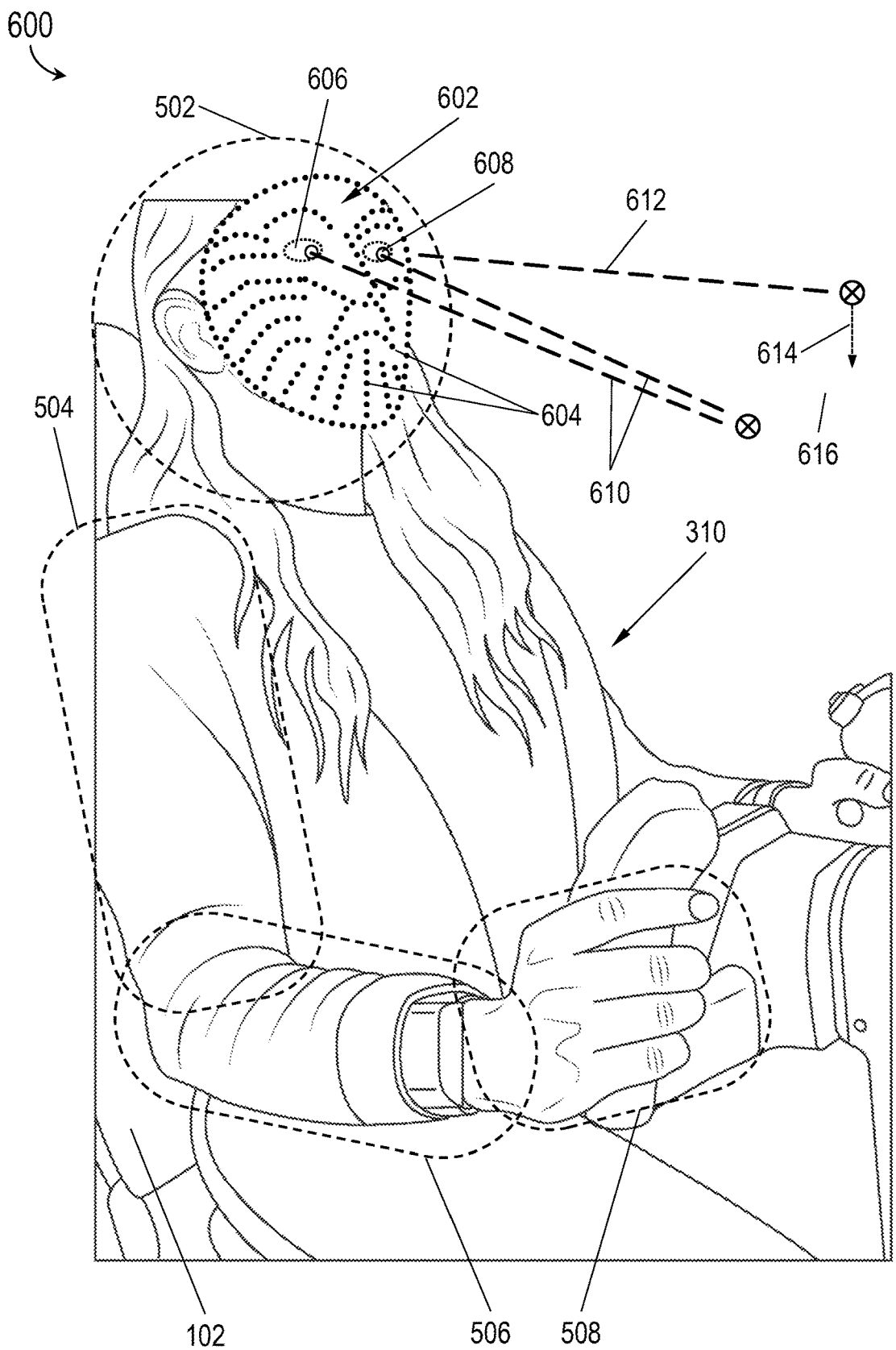
FIGS. 6A and 6B illustrate image analysis operations of the system of FIG. 3.

Referring to FIG. 6A, an image 600 captured by the camera (302, FIG. 5) is shown. The image 600 may portray the operator 310 within the control space (100. FIG. 1), e.g., seated in the pilot seat 102, and may include identified target spaces associated with the operator's head (502), upper/lower arms (506), and hands/fingers (508).

In embodiments, the face detection module (402, FIG. 4A) may analyze buffered images 600 by incorporating pre-trained deep learning models (410, FIG. 4A) to determine (416) if a face 602 is present within the image. For example, the face detection module may focus on the target space 502 corresponding to the head of the operator 310 and attempt to identify (e.g., via deep learning-trained facial detection models (412, FIG. 4A) facial features and/or contours 604, eyes 606, and pupils 608. In some embodiments, the face detection module 402 may determine a head pose, e.g., a position and orientation of the head 602a of the operator 310.

In embodiments, when a face 602 is detected to a sufficient confidence level, the face detection module 402 may take further action (418, FIG. 4A) by determining a gaze direction 610 of the pupils 608 and comparing the determined gaze direction to target poses (314, FIGS. 3 and 5) in the location database (304, FIG. 3) to identify the current focus target of the operator's gaze (e.g., what the operator 310 is currently looking at). For example, the current gaze direction 610 may be assessed relative to a default gaze orientation 612, e.g., corresponding to a gaze orientation straight ahead of the pilot seat 102 and at eye level. In embodiments, the gaze direction 610 may be characterized by a particular vertical distance 614 and rotational angle 616 (e.g., relative to a vertical or z-axis of the operator 310) relative to the default gaze orientation 612.

Figure 6B:
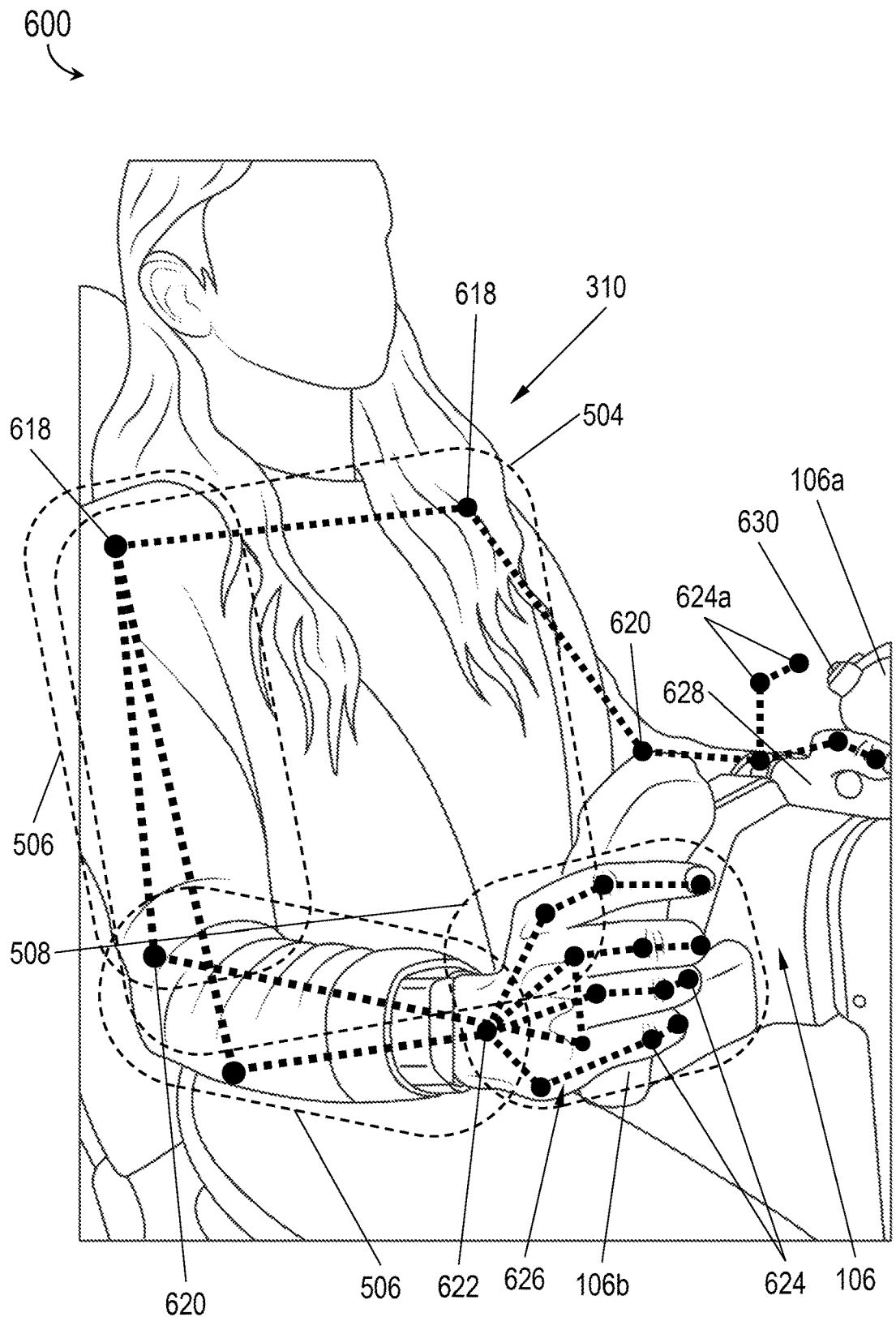

In embodiments, referring also to FIG. 6B, the body pose estimation module (404, FIG. 4A) may independently analyze the image 600 to detect and identify a current body pose of the operator 310. For example, the body pose estimation module 404 may focus on target spaces 504, 506, 508 corresponding to the torso, arms, hands, and fingers of the operator 310 and attempt to determine (420, FIG. 4A) whether the torso, arms, hands, and fingers of the operator can be identified with sufficient confidence. In embodiments, the body pose estimation module 404 may identify shapes within the image 600, comparing the identified shapes to anatomical models (e.g., via deep learning trained body part detection (414, FIG. 4A) to identify points corresponding to key skeletal joints (e.g., shoulder joints 618, elbow joints 620, wrist joints 622, knuckles/finger joints 624) and thereby determine (422, FIG. 4A) the current position and orientation of the torso, shoulders, hands and/or fingers of the operator 310. In some embodiments, the gaze direction 610 may include the determined head pose (e.g., which head pose may or may not harmonize with the gaze direction, or with body pose estimates as determined below).

In embodiments, when a current gaze direction (610, FIG. 6A) and body pose have been determined to a sufficient confidence level, the action/intent classifier (430, FIG. 4B) of the intent prediction module (406, FIGS. 4A-B) may map these determinations to target poses 314 in the location database 304 to identify current focus targets (e.g., which interfaces correspond to the current gaze direction and/or body pose; what the operator 310 is looking at, touching, actuating, reaching for) and thereby determine a probability distribution (432, FIG. 4B) of operator intent. For example, the right hand 626 of the operator 310 may be determined to be at or near the location of the right-side handle 106b of the control stick 106, relative to the camera 302. If the current gaze direction 610 does not correspond to the control stick 106, but to some other component proximate to the control stick 106 and within range of the right hand 626 (e.g., the navigational display (112b, FIG. 5)), the intent prediction module 406 may determine a high probability that the operator 310 will next engage with the navigational display (e.g., particularly if the navigational display is a touchscreen configured for physical as well as visual engagement).

In some embodiments, the body pose estimation module 404 and/or intent prediction module 406 may identify a body part or parts as not in direct engagement with a user or control interface, but hovering near the interface. For example, the left hand 628 of the operator 310 may be identified as on or proximate to the left-side handle 106a of the control stick 106, but finger joints 624a of the left hand may be identified as hovering over or near a communications switch 630 on the left-side handle. Accordingly, the probability distribution 432 of the intent prediction module 406 may reflect a higher probability of imminent engagement by the operator 310 with the communications switch 630 (e.g., for initiation of a transmission, depending on operational context (434, FIG. 4B)).

Figure 7:
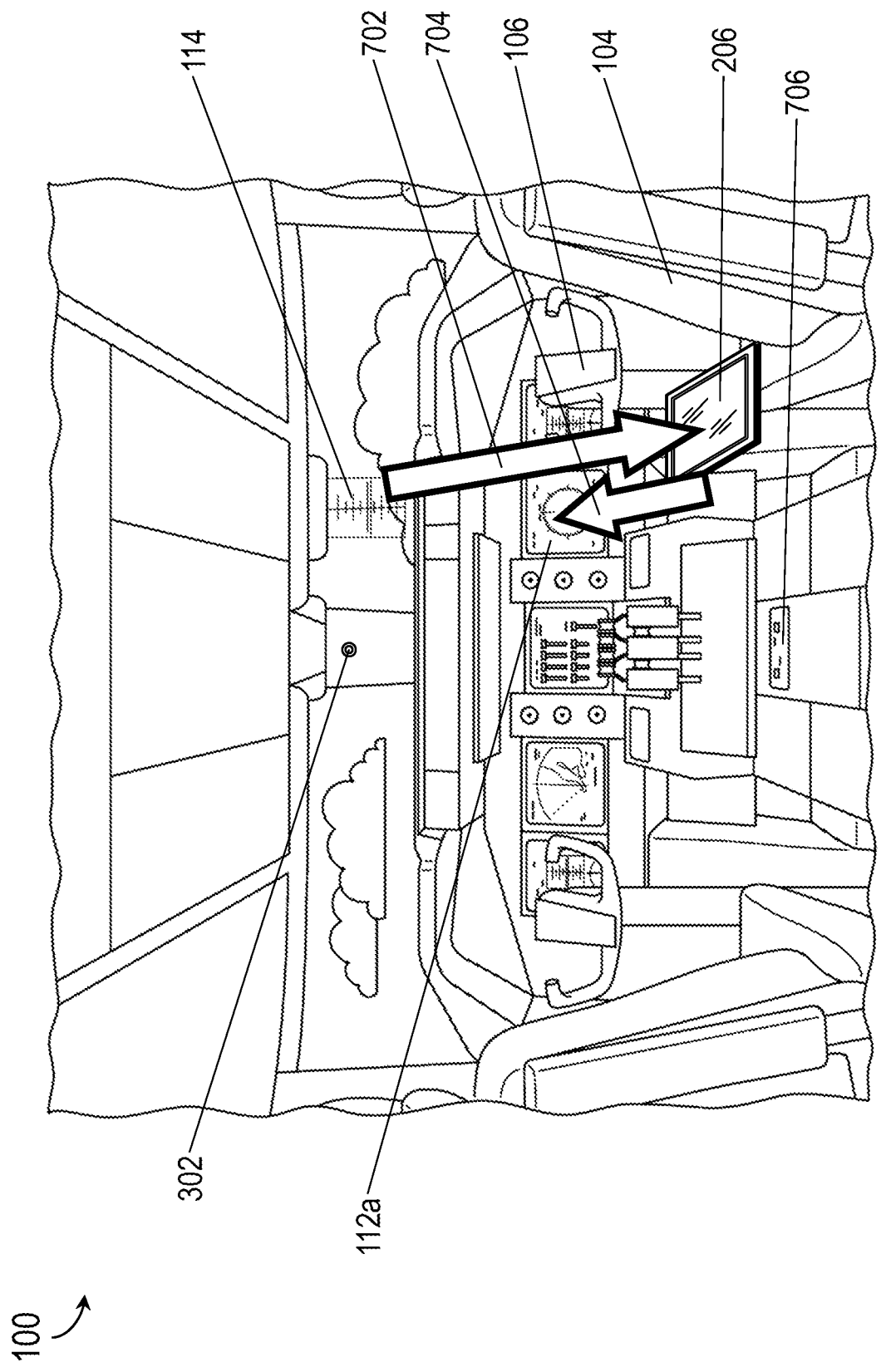
FIG. 7 is an illustration of the control space of FIGS. 1 and 2 further illustrating movement pattern detection operations of the system of FIG. 3.

Referring now to FIG. 7, the control space 100 is shown.

In embodiments, the system 300 of FIG. 3 may analyze images (600, FIGS. 6A-B) captured by the camera 302 as image sequences or streams in order to recognize and infer more complex patterns of movement and behavior on the part of the operator (310, FIG. 3). For example, the system 300 may observe longer-term image sequences in order to infer more complex patterns of behavior on the part of a particular operator 310 over longer time frames or sequences of actions, e.g., the frequency of scan patterns during a cruise phase as opposed to a descent phase. For example, the camera 302 may be oriented on an operator 310 occupying the co-pilot seat 104. Based on analysis of images 600 captured by the camera 302, the current gaze direction (610, FIG. 6A) of the operator 310 may be determined to be currently directed at the HUD 114. Subsequent images captured by the camera 302 may detect a shift in the gaze direction 610 of the operator 310, e.g., downward (702) to a mobile device 206 and then back up (704) to the PFD 112a.

The system 300 may detect, identify, and store the scanning sequence such that when the gaze direction 610 of the operator 310 is subsequently determined to be directed at the HUD 114, the system 300 may infer completion of the movement pattern, e.g., via a shift in gaze direction 610 to the mobile device 206 and then to the PFD 112a. Similarly, the system 300 may analyze image sequences to detect shifts in body pose, e.g., from a first pose associated with a first interface engagement to a second pose associated with the next interface engagement (for example, an operator 310 in the co-pilot seat 104 may move their left hand from the control stick 106 to a central control panel 706, e.g., in order for the operator to initiate communications).

In some embodiments, the system 300 may infer intent of the operator 310 based on secondary movement or action detected by the camera 302. For example, the system 300 may infer a steering change based on detected motion of a hand of the operator 310 toward the control stick 106. However, immediately prior to grasping the control stick 106, the camera 302 may observe the operator 310 to brace (e.g., shift in posture) in the co-pilot seat 104, which may indicate to the system 300 a more drastic change in heading (e.g., a sharper turn) than motion toward the control stick alone.

In some embodiments, the system 300 may make more complex inferences based on longer image sequences and patterns detected therewithin. Similarly, the system 300 may build and add to a knowledge base (e.g., operator profile) for each operator 310 as the operator is monitored over time. For example, long-term analysis of a particular operator 310 over multiple flights may establish longer-term patterns of performance and usage which the system 300 may store for use in subsequent assessments of that same operator. Any deviations from expected actions (e.g., historically likely actions based on prior analysis of similar images 600) or longer-term anomalous behavior may trigger a warning or caution, or may be further analyzed to determine root causes.

In embodiments, future focus targets inferred by the system 300 may be used to develop and deploy user interfaces with greater adaptive or intuitive capacity, and to evaluate deviations from expected norms (e.g., a physical engagement with a control interface or other focus target inconsistent or divergent from a likely focus target as suggested by a detected gaze or pose). For example, as the system 300 learns the particular gaze and body pose patterns associated with a particular operator 310, the system may also learn to identify deviations from these patterns. For example, the system 300 may monitor short-term or long-term deviations from established movement or engagement patterns in order to generate any necessary warnings, cautions, or alerts, but also to track longer-term anomalous behaviors on the part of an operator 310. For example, shorter-term anomalous events (e.g., a single anomalous engagement) may trigger an advisory, warning, or alert depending on severity. Longer-term patterns of anomalous behavior, or repeated such patterns, may be indicative of more complex problems, e.g., operator impairment, lack of competence, or malicious operator behavior.

Figure 8:
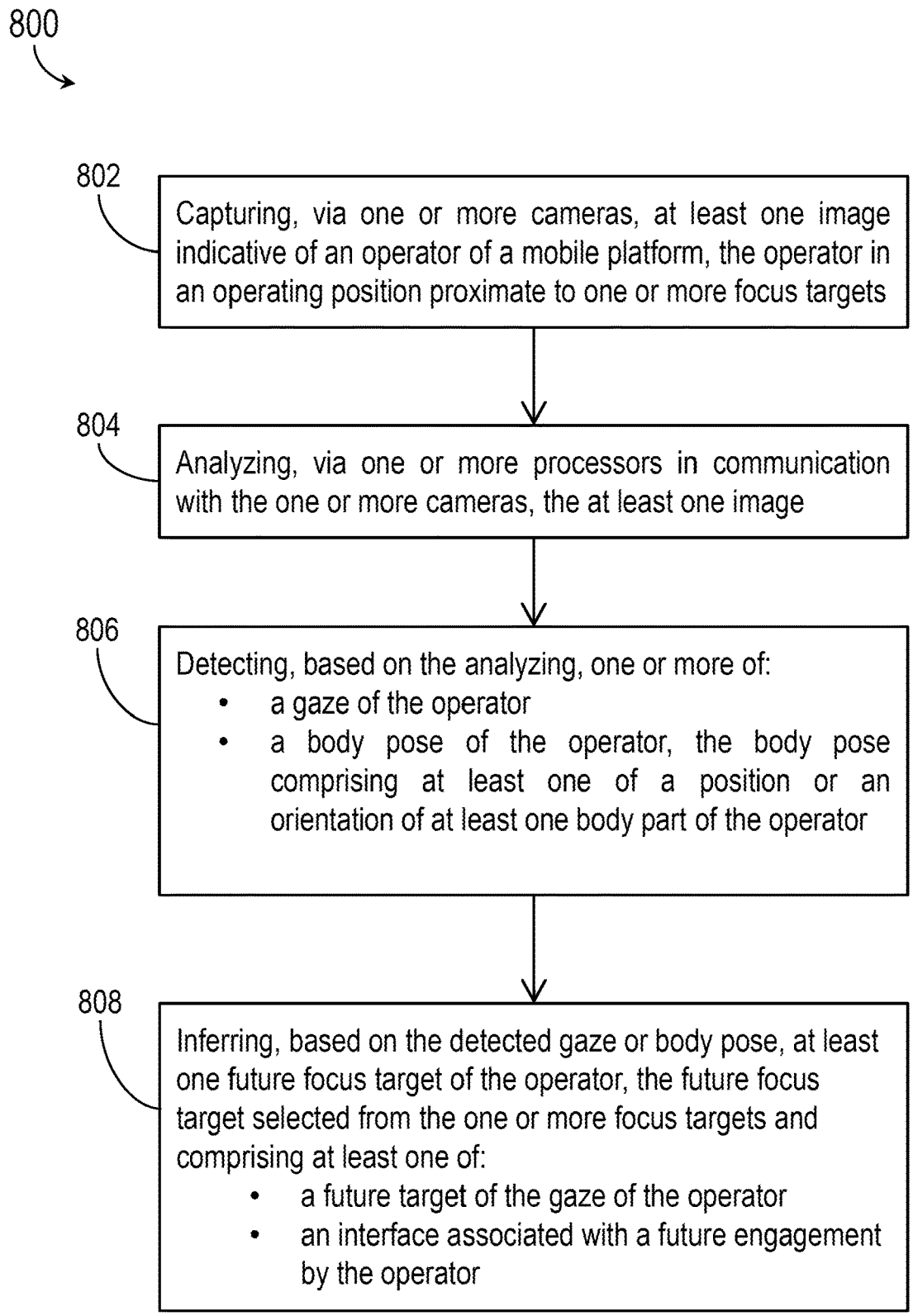
FIG. 8 is a flow diagram illustrating a method for inferring intent of an operator of a mobile platform by detecting operator focus according to example embodiments of this disclosure.

Referring to FIG. 8, the method 800 may be implemented by the system 300 and may include the following steps.

At a step 802, cameras within a control space of an aircraft or mobile platform capture images portraying an operator of the aircraft, where the operator is in a pilot seat or other like control position proximate to multiple focus targets with which the operator may visually and/or physically engage. For example, the cameras may be oriented toward the operator so as to keep the operator substantially in the field of view (e.g., at least the operator's head, upper body, arms, and hands) and capture image sequences portraying the operator in the control seat. The cameras may capture a continuous feed of the operator any time they are in the control seat throughout the full flight sequence, from taxiing to the runway to takeoff to climb to cruise to descent to landing to taxiing to the ultimate destination, including any pre-flight and post-flight checks.

At a step 804, image processors in communication with the cameras analyze the captured images to detect facial features and body parts of the operator. For example, individual frames or sequences of frames may be analyzed on both a short-term and long-term basis to process image content as well as changes in image content from frame to frame and over longer durations. Image sequences may be analyzed in the context of pose information for every articulable control and/or display unit within the control space, e.g., the position and orientation of each control or display relative to the operator and/or the control seat.

At a step 806, based on the image analysis a gaze and/or body pose of the operator is determined. For example, the orientation of the operator's eyes with respect to a default orientation is determined. Similarly, the position and orientation (pose) of the operator's body (as well as specific body parts, e.g., hands, arms, torso) is determined. For example, the image processors may identify an orientation of the operator's eyes (e.g., left or right relative to a rotational z-axis, up or down relative to a rotational x-axis) or a change in gaze orientation over time. Similarly, the image processors may identify a movement of a hand, arm, and/or torso (e.g., a change in the orientation of the operator's upper body) of the operator over time.

At a step 808, based on the determined gaze and/or body pose, future focus targets are determined, e.g., windows, display surfaces, and/or controls with which the operator is most likely to imminently engage, visually (e.g., by looking at a display surface, window, etc.) and/or physically (e.g., by actuating a control), based on a particular image or image sequence. For example, the operator's gaze direction may be indicative of the operator's current or imminent focus, e.g., which display surface, visual indicator, or other visual element the operator is viewing or is about to view. A gaze direction shifting slightly upward from the horizontal and rotating slowly but consistently right to left (from the perspective of the cameras) may be indicative of an imminent sweeping visual scan through an aircraft window, from a lateral to a forward view. The processors may also infer a sweeping visual scan based on past analyses of similar image content. In some embodiments, the processors may infer an intent to activate a particular control, e.g., based on hand movement toward or hovering proximate to the control. In some embodiments, two or more likely focus targets or control activations may be anticipated, e.g., in descending order of probability. In some embodiments, each likely focus target is associated with a probability or confidence level. In some embodiments, determination of a likely future focus target (or probability distribution thereof) is at least partially based on additional operational context, e.g., flight segment or operating conditions provided by a flight management system (FMS). In some embodiments, based on an extended sequence of images, multiple shifts in gaze and/or body pose are detected and therefrom an extended pattern of movement or engagement by the operator is detected.

We claim:

1. A system for inferring operator intent by detecting operator focus, the system comprising:

one or more cameras positioned within a control space of a mobile platform, the control space comprising one or more interfaces, the one or more cameras oriented toward a control position within the control space and configured to capture at least one image corresponding to:
a gaze of an operator occupying the control position;
or
a body pose of the operator, the body pose comprising at least one of a position or an orientation of at least one body part of the operator;
a memory configured for storage of one or more target poses, each target pose associated with at least one of a position or an orientation of the one or more interfaces, each target pose relative to the one or more cameras;
and
one or more processors in communication with the one or more cameras and the memory, the one or more processors configured to:
receive the at least one image;
detect, based on the at least one image, at least one of the gaze or the body pose;
train the memory using training data corresponding to one or more observed parameters based on the detected gaze or the body pose;
and
based on the detected gaze or body pose and the one or more target poses, infer at least one future focus target of the operator, the future focus target comprising at least one of:
a future target of the gaze of the operator;
or
an interface associated with a future engagement by the operator,
wherein the one or more processors are configured to determine a confidence level corresponding to each future focus target.

2. The system for inferring operator intent of claim 1, wherein the body pose is associated with at least one of:
an arm pose of the operator;
a hand pose of the operator;
a finger pose of the operator;
a posture of the operator;
or
a torso orientation of the operator.

3. The system for inferring operator intent of claim 1, wherein the at least one future focus target is selected from a group including:
a window of the mobile platform;
a display of the mobile platform;
or
an auxiliary device associated with the operator.

4. The system for inferring operator intent of claim 1, wherein the at least one interface is selected from a group including:
a manual control configured to be engaged by the operator;
or
a touchscreen display surface configured to be engaged by the operator.

5. The system for inferring operator intent of claim 1, wherein the one or more processors are configured to:
receive operational context selected from a group including:
a flight segment, an identifier of the operator, a position of the mobile platform, or a heading of the mobile platform;
and
infer the at least one future focus target based at least partially on the operational context.

6. The system for inferring operator intent of claim 1, wherein the one or more processors are configured to:
store to the memory at least one operator profile corresponding to the operator, the at least one operator profile comprising one or more of:
an inferred future gaze target;
an inferred interface;
an inferred movement pattern;
a confidence level corresponding to the inferred future gaze target, interface, or inferred movement pattern;
or
operational context associated with the inferred future gaze target, interface, or inferred movement pattern.

7. The system for inferring operator intent of claim 6, wherein:
the one or more processors are configured to infer at least one of a second future gaze target, a second interface, or a second movement pattern associated with an operator based on the at least one operator profile.

8. The system for inferring operator intent of claim 1, wherein:
the at least one image includes at least one sequence of one or more images; and
the one or more processors are configured to:
detect, based on the at least one sequence, one or more of:
a gaze shift from a first gaze direction to a second gaze direction;
or
a pose change from a first body pose to a second body pose;
and
infer the at least one future focus target based on the gaze shift or pose change.

9. The system for inferring operator intent of claim 8, wherein the one or more processors are configured to:
infer, based on the one or more of a gaze shift or a pose change, at least one movement pattern of the operator;
and
store the at least one inferred movement pattern to the memory.

10. A method for inferring operator intent by detecting operator focus, the method comprising:
capturing, via one or more cameras, at least one image indicative of an operator of a mobile platform, the operator in an operating position proximate to one or more focus targets;
analyzing, via one or more processors in communication with the one or more cameras, the at least one image;
detecting, based on the analyzing, one or more of:
a gaze of the operator;
or
a body pose of the operator, the body pose comprising at least one of a position or an orientation of at least one body part of the operator;
training a memory using training data corresponding to one or more observed parameters based on the detected gaze or the body pose;
and inferring, based on the detected gaze or body pose, at least one future focus target of the operator, the future focus target selected from the one or more focus targets and comprising at least one of:
    a future target of the gaze of the operator; or
    an interface associated with a future engagement by the operator,
wherein the one or more processors are configured to determine a confidence level corresponding to each future focus target.

11. The method of claim 10, wherein:
analyzing the at least one image includes analyzing at least one sequence of one or more images; and
detecting one or more of a gaze of the operator or a body pose of the operator includes detecting, based on the at least one sequence, at least one of 1) A gaze shift from a first gaze direction to a second gaze direction or 2) a pose change from a first body pose to a second body pose.

12. The method of claim 11, wherein:
inferring at least one future focus target of the operator includes inferring at least one movement pattern of the operator based on the detected gaze shift or pose change.

13. The method of claim 10, further comprising:
receiving, via the one or more processors, operational context selected from a group including: a flight segment; an identifier of the operator; a position of the mobile platform; or a heading of the mobile platform; and wherein
inferring, based on the detected gaze or body pose, at least one future focus target of the operator includes inferring the at least one future focus target based at least partially on the operational context.

\* \* \* \* \*